United States Patent Office 3,616,760
Patented Nov. 2, 1971

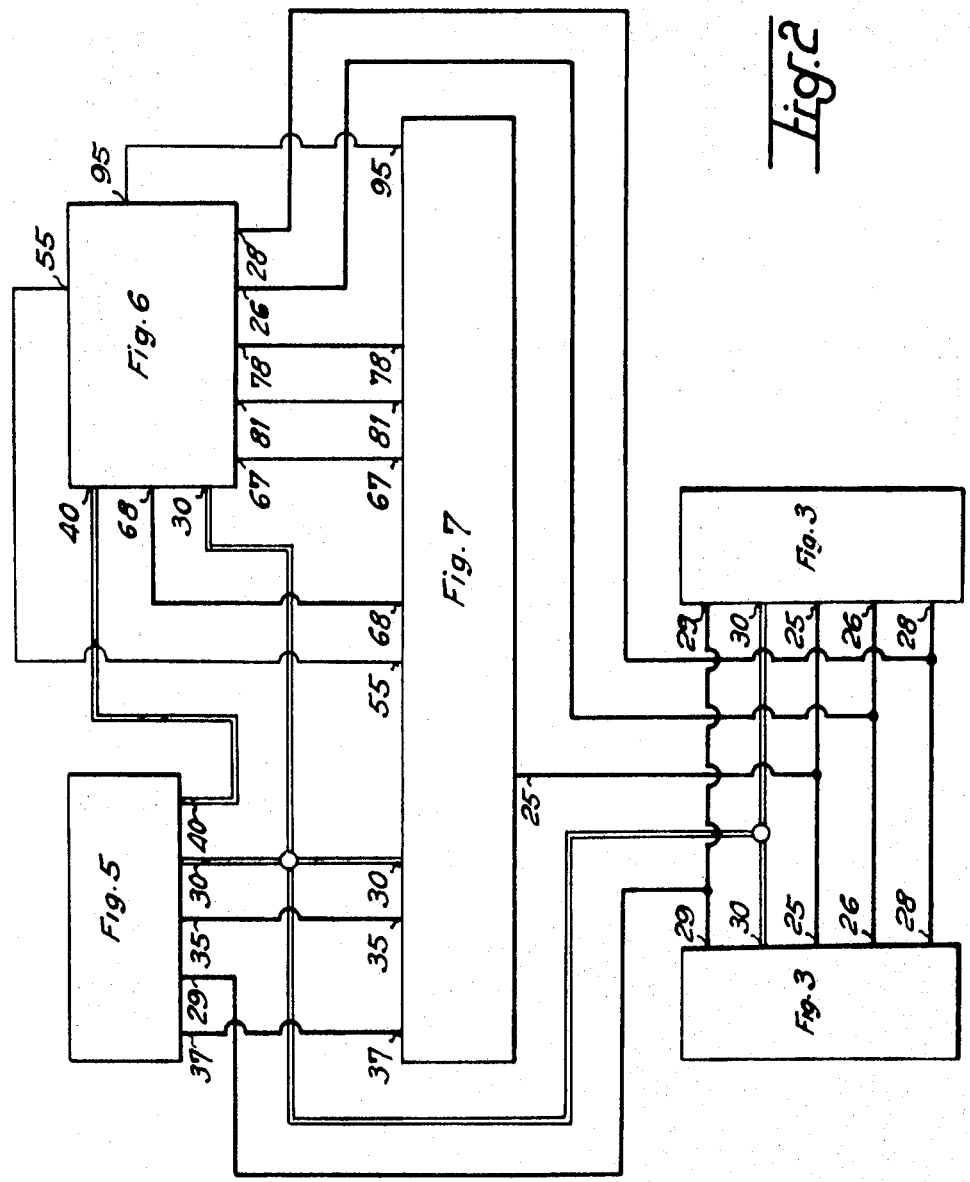

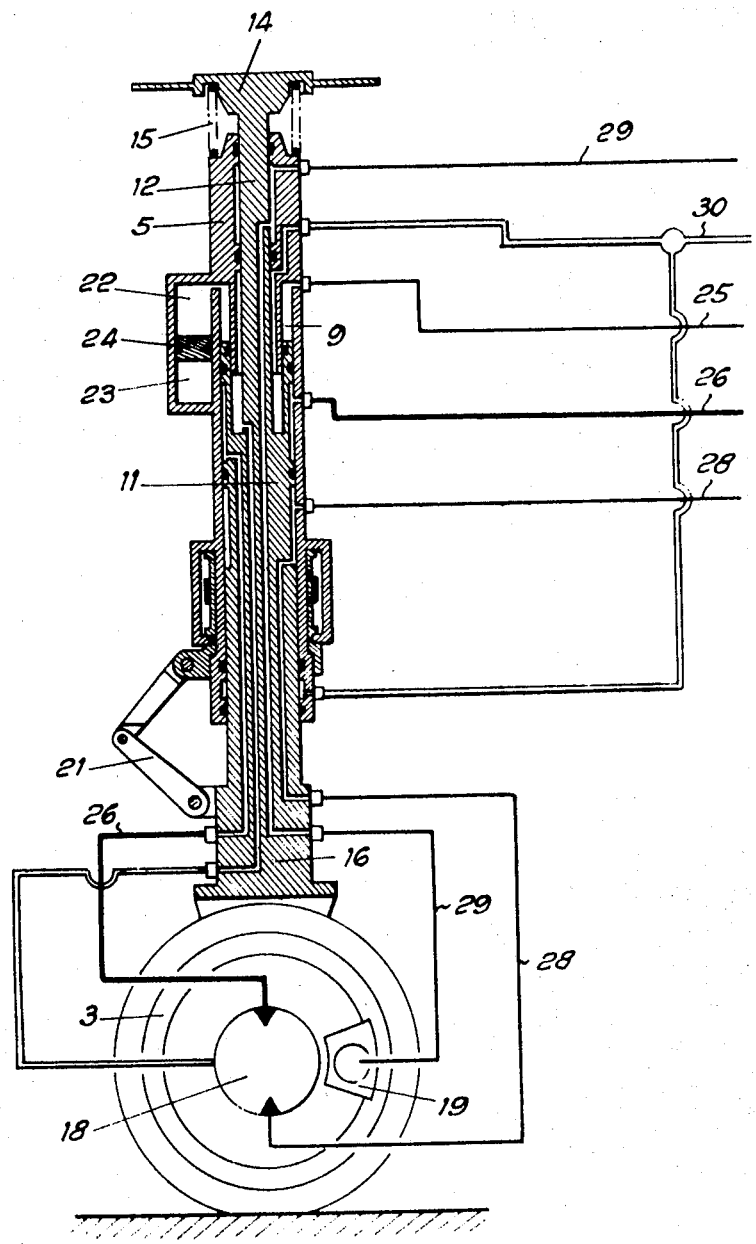

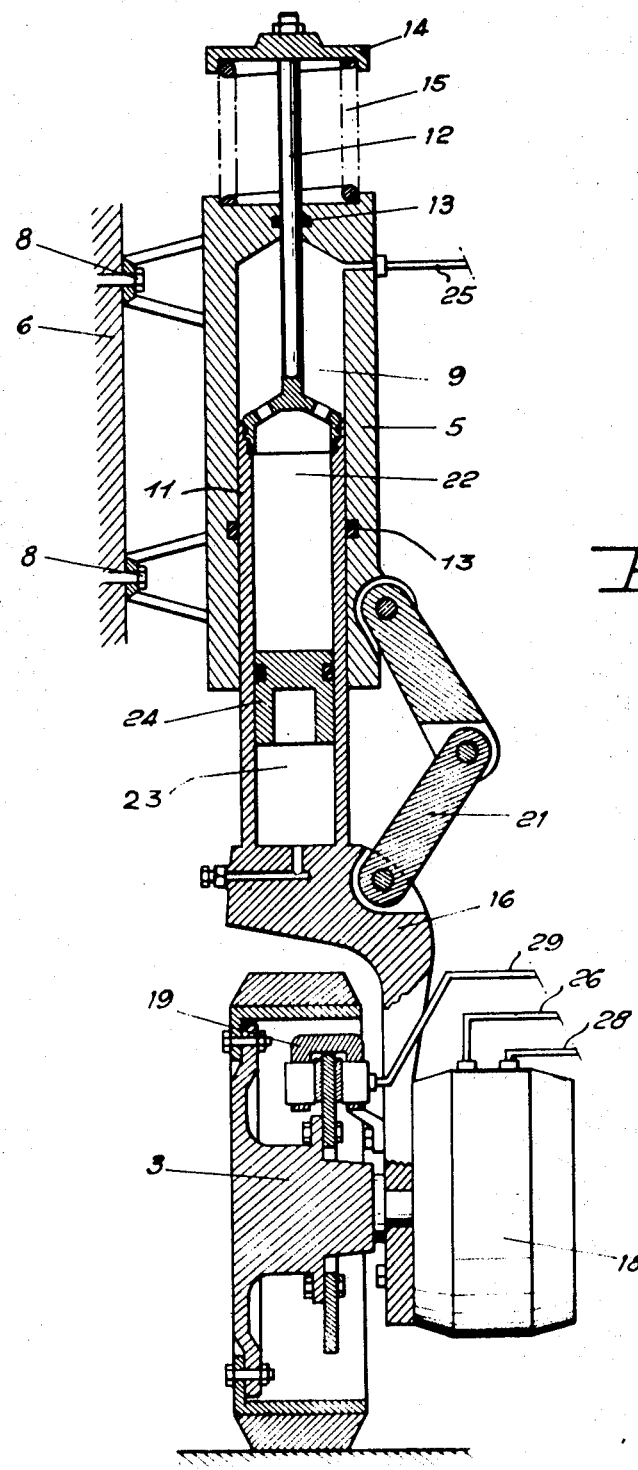

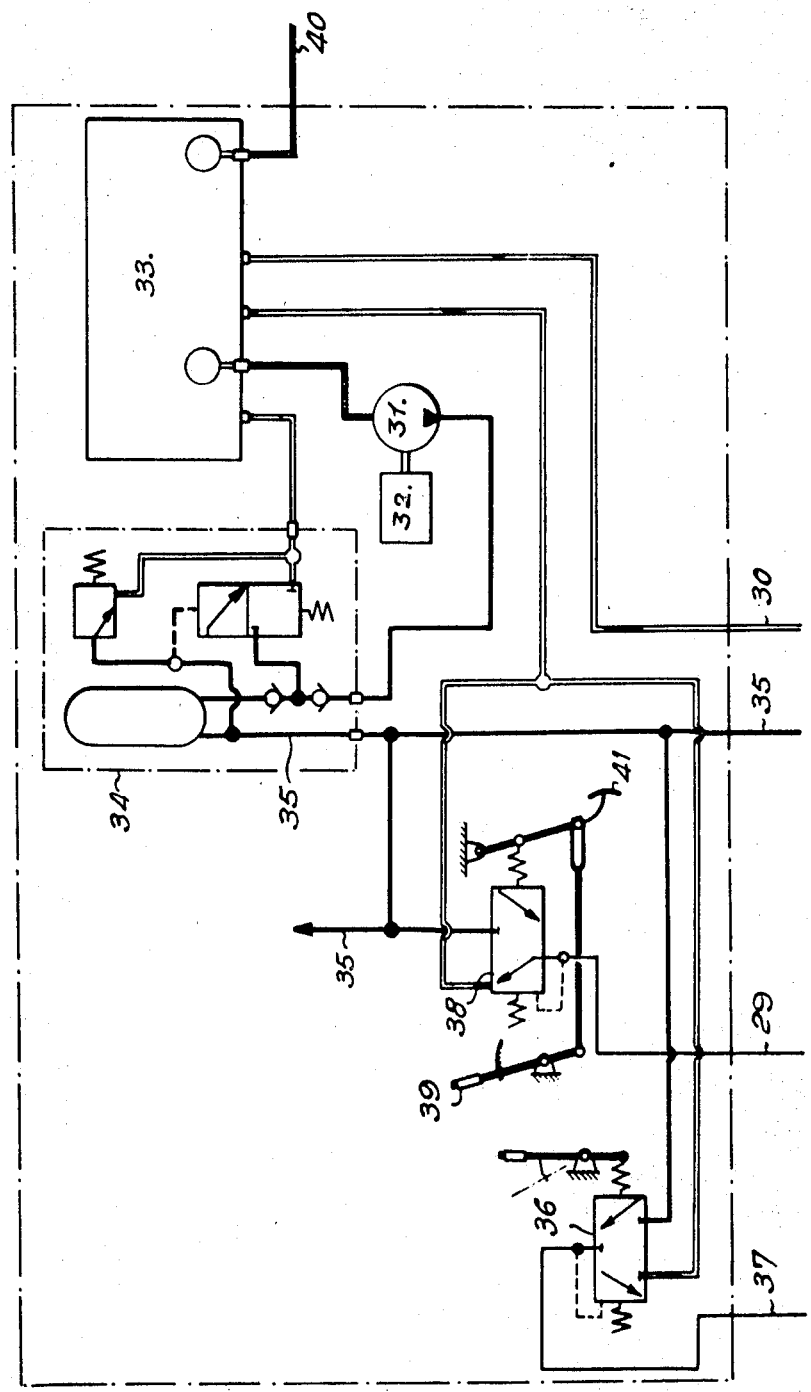

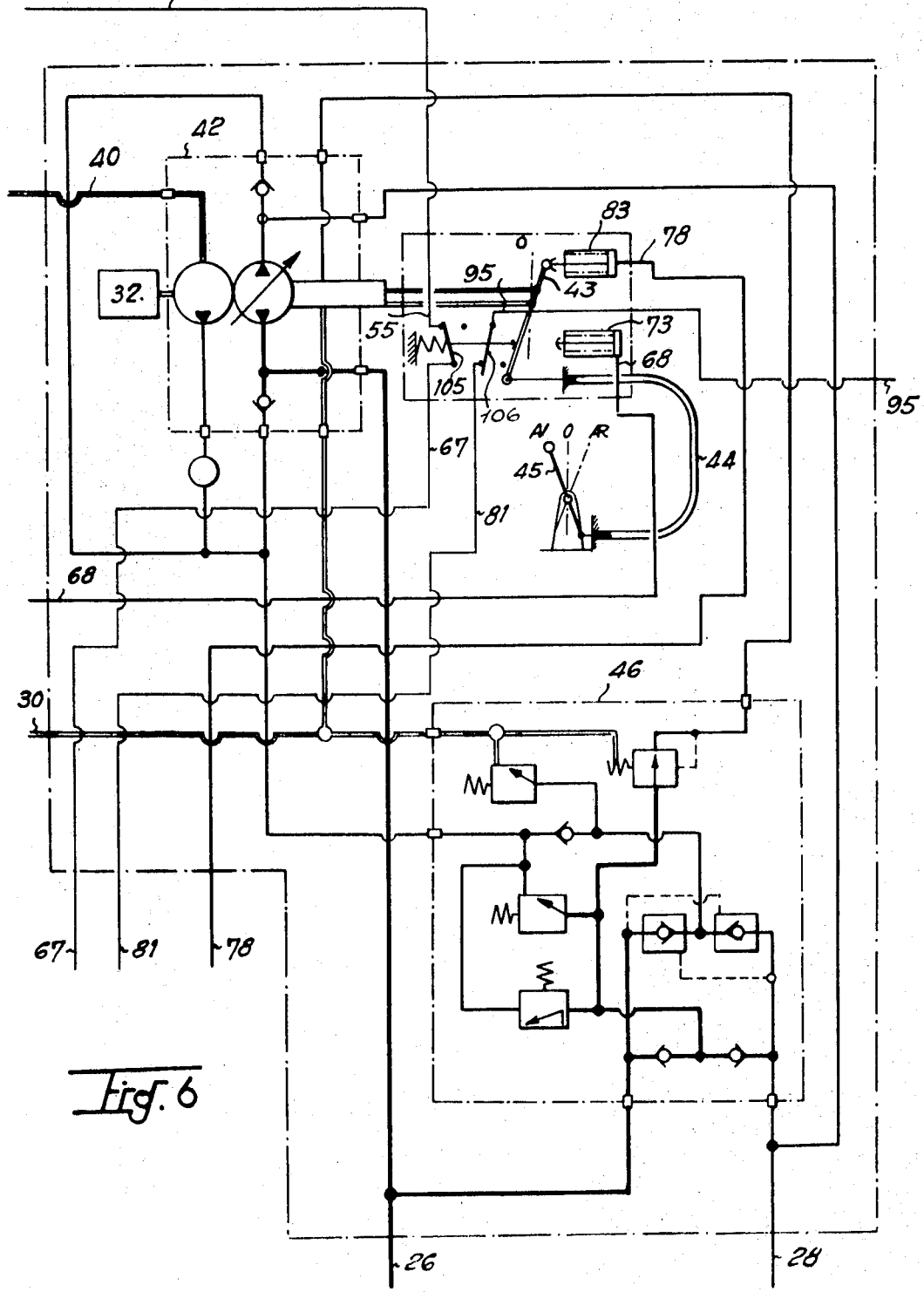

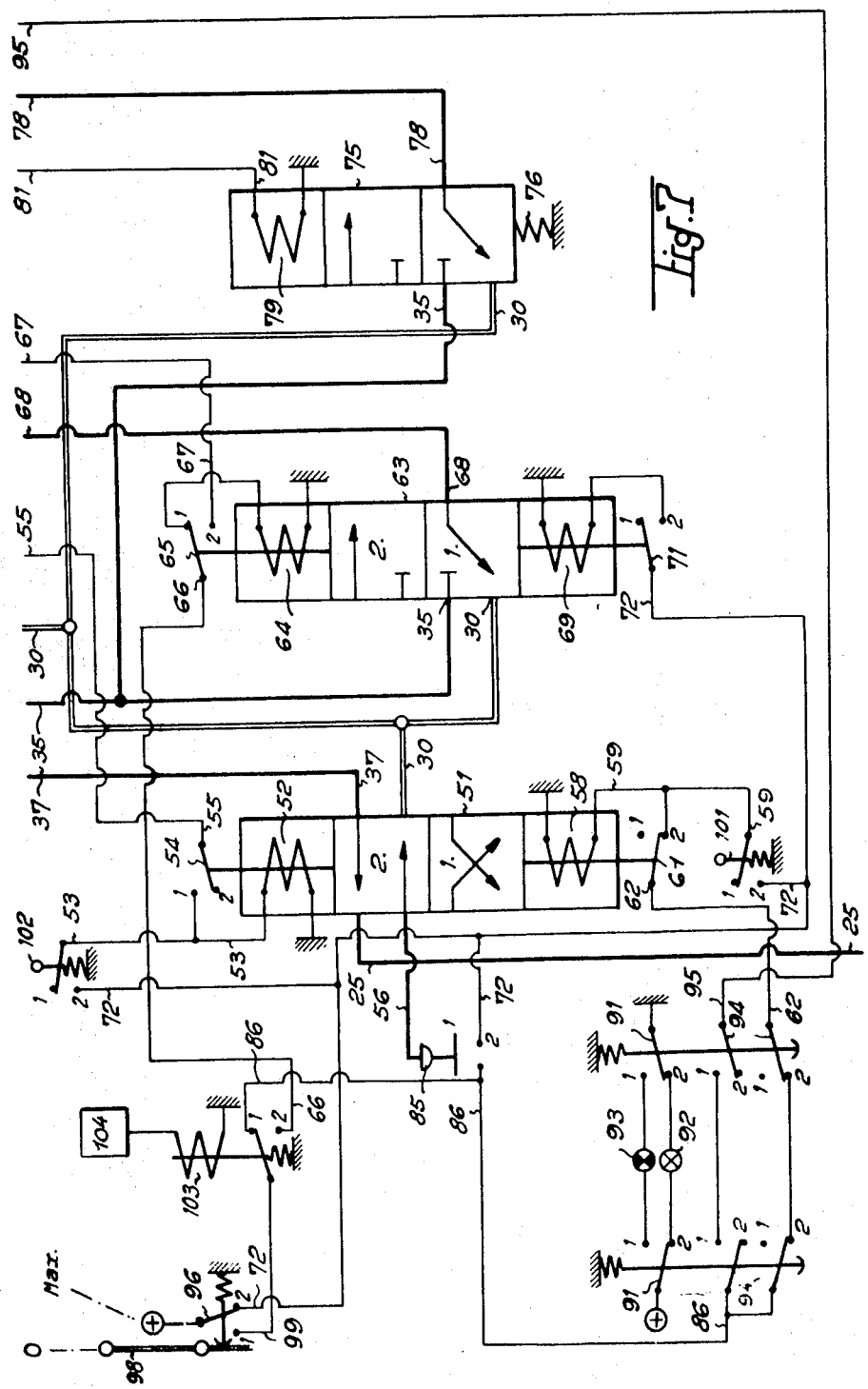

3,616,760
AUXILIARY PROPULSION FOR AIR-CUSHION
VEHICLES
Rene Lucien, Neuilly-sur-Seine, Pierre Marie Ghobert, Paris, and Yves Andre Pascal, Montrouge, France, assignors to Societe Messier and Societe de l'Aerotrain, both of Paris, France
Filed Dec. 3, 1969, Ser. No. 881,726
Claims priority, application France, Dec. 3, 1968, 176,464
Int. Cl. B61b 13/08
U.S. Cl. 104—23 B                     2 Claims

ABSTRACT OF THE DISCLOSURE

An air cushion vehicle including a ground-effect propulsion system consisting of a main propulsion system and an auxiliary propulsion system usable during certain operating conditions of the vehicle over portions of the vehicle track. The auxiliary propulsion system is constituted of one or more retractable wheels actuated by a hydraulic system and is intended for use below a predetermined vehicular transition speed.

---

The present invention relates to air-cushion vehicles having a propulsion system which does not require any contact whatever with the ground (with an air-screw or a reactor, for example).

It happens that under certain conditions and/or over certain sections of the vehicle track, it is essential or simply preferable that the said propulsion system should not be utilized and it is therefore desirable to provide an auxiliary propulsion system which then replaces the main propulsion system.

In consequence, the invention relates to an auxiliary propulsion system of this kind, which comprises one or a plurality of retractable wheels driven by hydraulic motors, a hydraulic supply unit, a hydraulic transmission between the supply unit and the motors, and hydraulic and electric drives. The said auxiliary propulsion system is of course only provided for use below a certain speed V known as the transition speed.

The operation of the system according to the invention should comply with the following essential requirements:

Starting from the stationary position of the vehicle, to bring the wheels into contact with the ground (if they are not already in contact), and then to put the auxiliary propulsion into action, which sets the vehicle in motion;

At the transition speed V, to raise the retractable wheels and to put the main propulsion into action, which accelerates the vehicle to speeds beyond the speed V;

During running at speeds higher than V, to lock the wheels in the retracted position.

After running at a speed higher than the transition speed V, when the vehicle slows down to the speed V, it may also be advantageous to drive the retractable wheels at the speed of rotation corresponding to V, and then to bring them into contact with the ground.

Briefly, the auxiliary propulsion system according to the invention is a hydraulic propulsion system comprising four main parts, namely, one or a plurality, for example two, trains of retractable wheels, a constant pressure hydraulic supply unit, a hydraulic transmission and a group of electro-hydraulic operating and control equipments, each train being constituted by a body rigidly fixed to the structure of the vehicle and comprising a bore in which slides a piston with rod and cup and a lifting spring between the cup and the body, the piston provided with a fork carrying the hydraulic motor, the wheel and the brake with articulated arms between the body and the fork, and in the body, a chamber communicating with the bore and separated by a free piston from a chamber filled with nitrogen under pressure, the hydraulic supply unit comprising a pump, an accumulator-regulator, a pressure-reducing adjustable valve for lowering the retractable wheels, and an adjustable pressure-reducing valve for the brakes, the hydraulic transmission comprising a variable-delivery pump controlled by a running lever, the whole of the equipment mainly comprising an electro-distributor with two stable positions for lifting and lowering the retractable wheels, further supplying in opposition a pressure contact, a second electro-distributor with two stable positions for control during running, actuating a jack which puts the running lever in the position of maximum output, and a third electro-distributor with a single stable position for control during running, actuating a jack which puts the running lever in the position of zero output.

One embodiment of the invention will be described with reference to the accompanying drawings, given by way of examples and not in any limitative sense. In these drawings:

FIG. 2 shows the assembly of for example two FIGS. 3 or 4, of FIG. 5, FIG. 6 and FIG. 7, this assembly giving the general hydraulic and electrical diagram;

FIG. 3 is a vertical cross-section, parallel to the plane of longitudinal symmetry of the vehicle of a train with a retractable wheel;

FIG. 4 is a vertical cross-section, perpendicular to the longitudinal plane of symmetry of the vehicle, of a retractable wheel train, slightly different from that preceding;

FIG. 5 shows diagrammatically the constant-pressure hydraulic supply unit;

FIG. 6 shows diagrammatically the hydraulic transmission; and

FIG. 7 shows diagrammatically the group of electro-hydraulic operating and control equipments.

Figure 1:
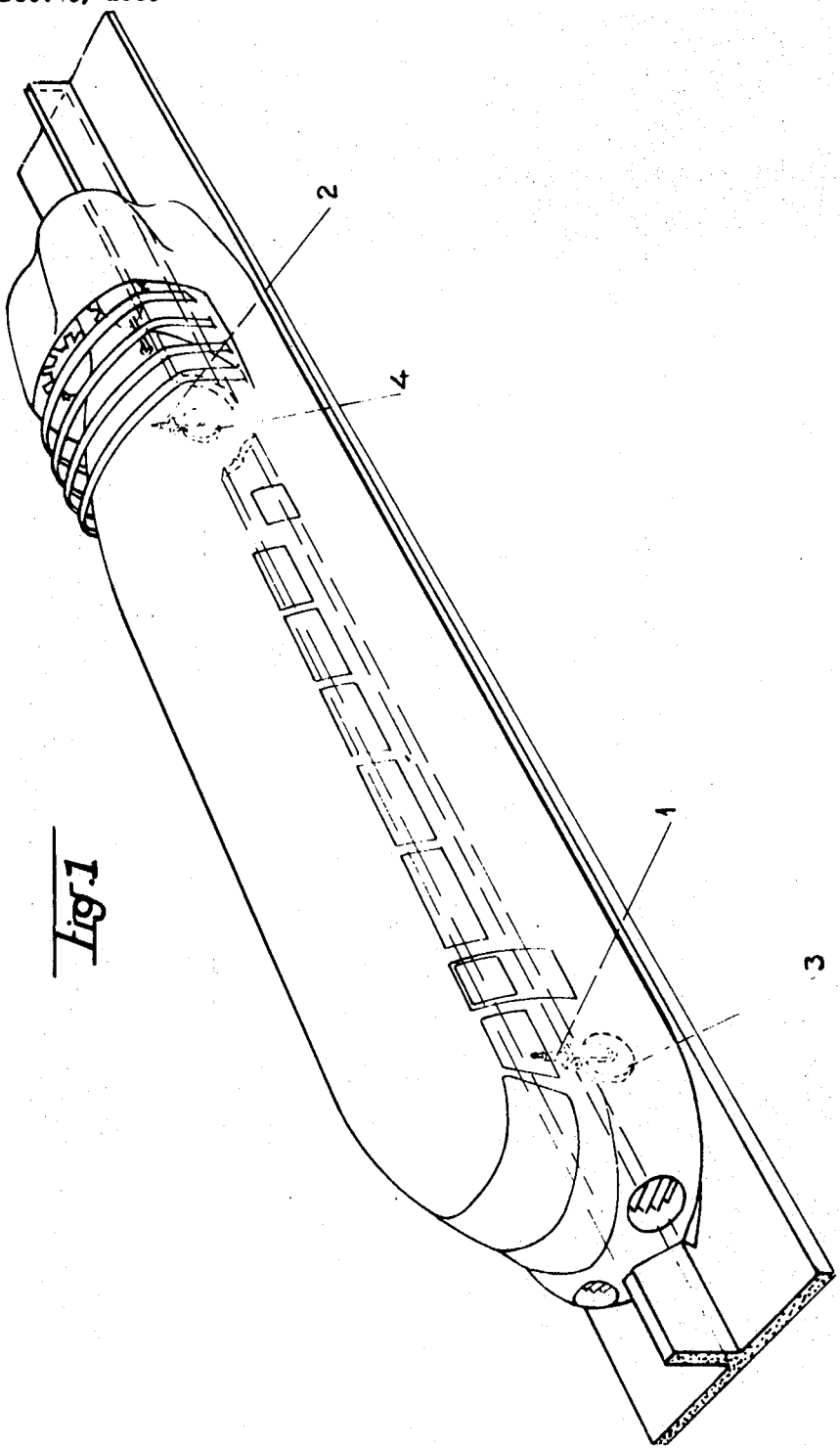
FIG. 1 is a diagrammatic perspective view of the vehicle.

With reference to FIG. 1, which is a diagrammatic view of the vehicle, the trains 1 and 2 on which the retractable wheels 3 and 4 are mounted, are fixed by appropriate means (described later) on the structure proper of the vehicle. The plane of the wheels 3 and 4 is parallel to the longitudinal plane of symmetry of the vehicle, and the axis of the trains 1 and 2 is vertical.

With reference to FIGS. 2 to 6, the auxiliary propulsion system comprises four main parts:

Two (for example) wheel-trains 1 and 2 with retractable wheels 3 and 4 (FIGS. 3 and 4);

A constant-pressure hydraulic supply unit (FIG. 5), supplying the oil under pressure necessary for lowering or raising the retractable wheels, together with the supply of other hydraulic services which may possibly be mounted on board the vehicle;

A hydraulic transmission (FIG. 6) ensuring the auxiliary propulsion proper;

A group of electro-hydraulic equipments for controlling the sequences (FIG. 7).

These other main parts of the auxiliary propulsion system will now be described below successively in detail.

With reference to FIGS. 3 and 4, the train 1 (or the train 2 which is essentially the same) is constituted by a body 5 fixed on the structure 6 of the vehicle by appropriate means 8. The body 5 is provided with a bore 9 in which slides a piston 11, extended by a rod 12. The chamber of the bore 9 is made fluid-tight with respect to the exterior by means of suitable fluid-tight sealing devices 13. The rod 12 carries a cap 14. Between this cap 14 and the body 5 is housed the spring 15.

The piston 11 is further provided with a fork 16 on which is mounted the auxiliary propulsion hydraulic motor 18, the wheel 3 and the brake 19. The plane of the wheel 3 remains constantly parallel to the longitudinal plane of symmetry of the vehicle by means of a pair of articulated arms 21 between the fork 16 and the body 5, which permit the longitudinal movements of the piston 11 while maintaining the wheel 3 in a pre-determined plane.

The piston comprises an internal bore divided into two separate chambers 22 and 23 by a free piston 24 (FIG. 4), or alternatively its equivalent (FIG. 3), the chamber of the bore 9 communicating with a chamber 22 separated from a chamber 23 by a free piston 24. The two chambers 9 and 22 are supplied with oil under pressure through a conduit 25. By varying the pressure in the conduit 25, the force of application of the wheel against the ground, which is the product of this pressure by the section of the bore 9, is varied.

The chamber 23 is filled with nitrogen under pressure. The purpose of this nitrogen chamber is two-fold:

On the one hand, it permits the absorption of the vertical movements of the wheel caused by inequalities of the ground surface;

On the other hand, in the event of removal of the pneumatic lift of the vehicle, it allows the wheels to move up by a sufficient amount without them having to support the whole weight of the vehicle. This latter then rests directly on the ground.

The hydraulic motor 18 is supplied through the conduits 26 and 28. The brake 19 is supplied with oil through the conduit 29. In order to apply the wheel against the ground, the conduit 25 is put under pressure. In order to lift the wheel above the ground, the conduit 25 is put to the tank; the spring 15 then causes upward movement of the wheel and ensures its maintenance in the top position by purely mechanical means acting by failure of pressure. One of the safety conditions to be observed is thus achieved, even in case of failure of the hydraulic pressure. Leakage and the return to teh tank are effected through a conduit 30.

With reference to FIG. 5, the constant pressure hydraulic supply unit comprises a pump 31 driven by a source of power 32 installed on the vehicle (an electric motor or a motor effecting the pneumatic lift by aircushion for example). This pump 31 takes its hydraulic oil from a tank 33 and charges an accumulator-regulator 34 with a built-in excess pressure valve. This accumulator-regulator has the purpose of maintaining in the general supply conduit 35 for the services, an available pressure comprised between a maximum value and a minimum value determined in dependence on the working characteristics of the elements to be actuated.

An adjustable pressure-reducing valve 36 supplied from the accumulator-regulator 34, permits the variation at will of the pressure (conduits 25 and 37) acting in the chamber 9 of the trains 1 and 2 in order to apply the wheels against the ground with a pre-determined force. It may in fact be necessary, depending on the nature of the ground and the loading condition of the vhicle (empty or loaded), to adjust the force of application of the wheels against the ground so as to obtain the best conditions of adhesion.

In order to keep the vehicle stationary or to slow it down to a low speed during the use of the auxiliary propulsion system, the brakes 19, preferably of the disc type, are supplied with pressure (conduit 29) from the accumulator-regulator 34 through an adjustable pressure-reading valve 38, operated either manually by a lever 39 or by a pedal 41.

The accumulator-regulator 34 also supplies oil under pressure to the various electro-hydraulic equipments ensuring the control of the lifting or lowering of the wheels 3 and 4 (as described below).

With reference to FIG. 6, the hydraulic transmission comprises a variable-delivery pump 42 which is associated with a topping-up pump shown in this case as forming an integral part of the pump 42. This pump is driven by the power source 32 installed on the vehicle. The variation of the delivery which it supplies is effected by the angular movement of a lever 43. This lever 43 is coupled by a remote-control 44 to a lever 45 on the control desk at the disposal of the operator. It is possible to reverse the direction of flow supplied by the pump 42 so as to propel the vehicle forward (normal running) or in reverse (the case of certain operations).

The hydraulic transmission further comprises a group of control devices 46 of known type which ensure the correct filling of the circuits of the hydraulic transmission and limit its working pressure, together with the pressure existing in the topping-up circuit (and the hydraulic motor or motors 18 of the retractable wheels).

Referring now to FIG. 7 and to FIGS. 3 to 6, the group of electro-hydraulic equipments which ensure the operation and the control of the lowering, raising, and rotation of the retractable wheels and the sequences necessary to the correct functioning of the system, comprises:

An electro-distributor 51 for controlling the raising and lowering of the retractable wheels, and having two stable positions. In position 2 (which is that shown), obtained by supplying the coil 52 through the wire 53 or through the end-of-travel contact 54 and the wire 55, the electro-distributor 51 on the one hand supplies the conduit 25 through the conduit 37 to effect the lowering of the retractable wheels, and on the other hand connects the conduit 56 to the tank through the conduit 30. In position 1, obtained by energizing the coil 58 through the wire 59 or through the end-of-travel contact 61 and the wire 62, it puts the conduit 25 to the tank through the conduit 30 to effect the lifting of the retractable wheels, while on the other hand it supplies the conduit 56 through the conduit 37;

An electro-distributor 63 for control of running on auxiliary propulsion, having two stable positions. In position 1 (which is that shown), obtained by energizing the coil 69 by the end-of-travel contact 71 and the wire 72, it puts the conduit 68 to the tank through the conduit 30. In position 2, obtained by energizing the coil 64 by the end-of-travel contact 65 and the wire 66, it supplies the conduit 68 through the general conduit system 35. This conduit 68 (FIG. 6) supplies a jack 73, which brings the lever 43 (delivery control) into the position of maximum output;

An electro-distributor 75 having a single stable position (restored by the spring 76), in which it puts the conduit 78 to the tank through the conduit 30. In the other position, obtained by energizing the coil 79 by the wire 81, it supplies the same conduit 78 through the general conduit system 35. This conduit 78 (FIG. 6) supplies a jack 83 which puts the lever 43 (delivery control) into the position of rest;

A pressure contact 85 which joins together the wires 86 and 72 when the conduit 56 is under pressure;

A reversing end-of-travel contact 91 actuated by the lifting and lowering of the retractable wheels, and lighting-up an indicator lamp 92 (wheel lowered) or an indicator lamp 95 (wheel raised);

Another reversing end-of-travel contact 94 actuated by the raising and lowering of the retractable wheels, and connecting the wire 86 to the wire 62 (wheel lowered) or to a wire 95 (wheel raised);

A reversing contact 96 actuated by the lever 98 which controls the main propulsion system, and connecting into connection with the positive pole the wire 72 (in the zero position) or the wire 99 (in the position of running on the main propulsion);

A push-button 101 for raising the wheels, which connects together the wires 72 and 59, and a push-button 102 for lowering the wheels, which connects together the wires 72 and 53;

A relay 103 which connects the wire 99 either to the wire 96 (rest contact) or to the wire 66 (working contact); the operation of the relay 103 is associated with an electric signal given by an instrument 104 which measures the speed of movement of the vehicle, the design of which does not form part of the present invention. This electric signal causes the excitation of the coil actuating the relay 103 when the speed of movement reaches the pre-determined value V of the transition speed, either for acceleration or for deceleration. The excitation of this coil is effected for a period of time, the value of which is determined as a function of the duration of the completion of certain operations which will be described later;

A contact 105 (FIG. 6) closed when the delivery control lever 43 is at maximum output, and then connecting together the wires 55 and 57;

Another contact 106 (FIG. 6), closed when the lever 43 is on maximum output and then joining together the wires 81 and 95.

If so desired, the system permits the lifting of the retractable wheels when the vehicle is stopped and when it is to be left, which causes its pneumatic support to be cut-off. In order to avoid unnecessary maintenance of pressure in the circuits which apply the wheels against the ground, an impulse on the push-button 101 enables the coil 58 of the electro-distributor 51 to be energized and causes the raising of the wheels by putting the conduit 25 to the tank and permits the action of the return spring 15. At the moment when the vehicle is to start again, it is only necessary to put the wheels back into their normal working position by giving an impulse on the push-button 102, which causes them to be applied against the ground.

What we claim is:

1. In a vehicle of the type supported by an air cushion, a system of hydraulic propulsion especially for use below a certain transition speed, said system comprising: at least one wheel train, said wheel train comprising a retractable wheel, its brake and a hydraulic motor per wheel; a constant-pressure hydraulic supply unit, a hydraulic transmission between said unit and said motor, and an electro-hydraulic operating and control equipment; said wheel train comprising a body rigidly fixed on the structure of said vehicle and comprising a bore, a piston slidably mounted in said bore, a lifting spring between said piston and said body, said piston carrying said wheel and its motor and its brake; said constant-pressure unit comprising a pump, an accumulator-regulator, a reducing valve adjustable by the driver for lowering said retractable wheel, a second reducing valve adjustable by the driver for the brake; said hydraulic transmission comprising a variable-delivery pump, a lever actuated at a distance by the driver and controlling said delivery; said electro-hydraulic equipment comprising a first electro-distributor with two stable positions for the raising and lowering of said retractable wheel, a pressure-actuated contact supplied from said distributor, a second electro-distributor with two stable positions for control of running, a jack operated by said second distributor and adapted to place said lever in the position of maximum flow-rate, a third electro-distributor with a single stable position for control of running, a second jack operated by said third distributor and adapted to place said lever in the position of zero flow-rate, and a device responsive to said transition speed.

2. A hydraulic propulsion system as claimed in claim 1 and further comprising: in said body, a first chamber communicating with said bore, a second chamber, a free piston mounted between said two chambers, said second chamber being filled with gas under pressure.

References Cited

UNITED STATES PATENTS

| 2,478,729 | 8/1949 | Westcott | 244—102 |
| 2,294,918 | 9/1942 | Levy | 244—102 |
| 3,369,497 | 2/1968 | Driver | 104—134 |

ARTHUR L. LA POINT, Primary Examiner

D. W. KEEN, Assistant Examiner

U.S. Cl. X.R.

244—102; 104—134